Patented June 24, 1930

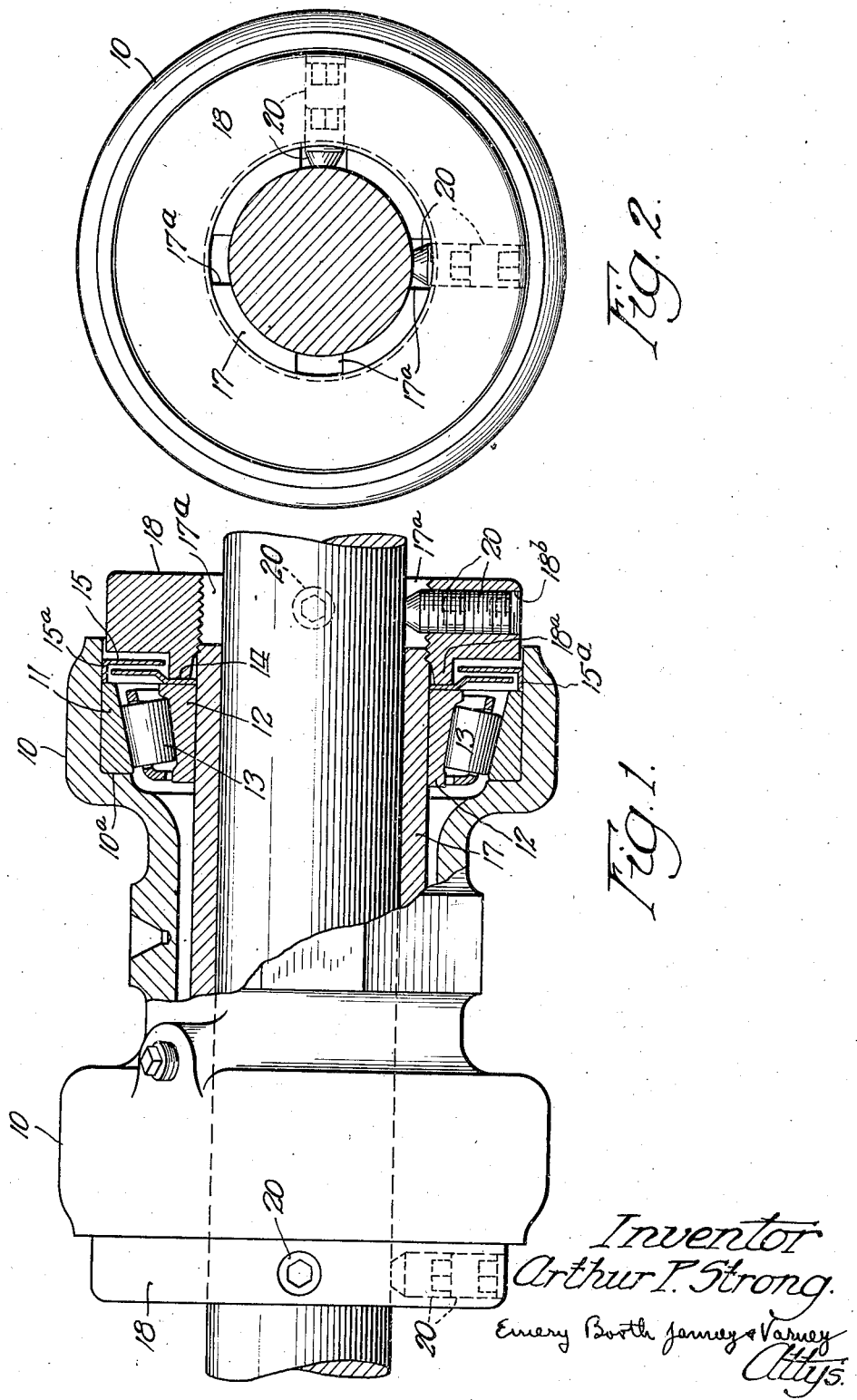

1,767,623

UNITED STATES PATENT OFFICE

ARTHUR P. STRONG, OF CHICAGO, ILLINOIS, ASSIGNOR TO DODGE MANUFACTURING CORPORATION, OF MISHAWAKA, INDIANA, A CORPORATION OF DELAWARE

BEARING

Application filed May 11, 1927. Serial No. 190,390.

This invention relates to improvements in bearings. Among its objects are to provide a bearing of compact construction, easily attached to a shaft or the like, and capable of ready adjustment of the bearing elements. Other objects will be apparent as set forth in the following specification and shown in the accompanying drawing in which I have illustrated a hanger bearing embodying my invention.

The bearing comprises an outer enclosing casing, generally indicated by numeral 10, having a recess adjacent each end to accommodate a bearing unit which is illustrated as comprising an outer cup 11 and inner cone 12, roller bearings 13 of tapered construction being shown as interposed in well-known manner. A shoulder 10$^a$ is provided at each end of the interior of the casing 10 and the bearing cup at that end is moved to abutment with the shoulder as indicated in the drawings. A grease ring or plate 14 is provided, the same being spaced from the cup 11 and terminating short of the inner wall of the recess in which the bearing is located. A second coacting ring or plate 15 is provided, being frictionally held by its flange 15$^a$ against the wall of the recess and being spaced from the ring 14 to form therewith a "labyrinth" grease seal, as it is termed. A tube or sleeve 17 is provided having a plurality of slots or apertures 17$^a$ at each end, shown as four in number in the embodiment illustrated. This tube 17 is threaded at each end for engagement by a ring 18 which is provided with the inwardly projecting rib 18$^a$. Each ring is provided with a pair of threaded holes 18$^b$, spaced less than 180° apart, although this number may be varied as desired. These holes are capable of alignment with the apertures or slots 17$^a$ of the underlying sleeve upon which the rings are threaded.

In assembly of the mechanism described, the bearing elements are inserted in the casing 10 together with the grease rings 14 and 15, and the rings 18 are then threaded on the tube 17 until the bearing cones are moved to proper position, the grease ring 14 being held by the rib 18$^a$ against the cone 12 in the manner illustrated. When this assembly is to be positioned with respect to a shaft for support thereof, set screws 20 are inserted in the threaded openings 18$^b$, the latter being shown as ninety degrees apart, and these set screws are rotated until they securely grip or contact the shaft as illustrated, in which position they will be entirely protected by the surrounding casing 10. Pressure exerted by the set screws 20 not only locks the rings 18 to the shaft but exerts a pull upon the threaded portions of the tube 17 opposite the set screws and draws the same into frictional contact with the shaft so that the tube and the cones are forced thereon to rotate with the shaft in well-known manner. Should wear occur in the bearing elements this may be eliminated by further rotation of the rings 18, the set screws having first been backed off to permit such rotation.

It would be apparent that the above described construction provides a self contained bearing structure which is easily assembled and attached to a shaft and which permits ready take-up of play in the bearings without difficulty. The construction also permits the obtaining of ample grip or engagement of the tube 17 with the shaft to ensure proper rotation of the coacting elements.

It will be apparent that my invention is susceptible of modification from the form illustrated and described and I do not wish to be restricted to such form except as defined in the appended claims.

What I claim is:

1. A device of the class described comprising a casing, a substantially non-contractile sleeve located in said casing and apertured adjacent its ends, a bearing unit interposed between said sleeve and casing, a ring threadedly engaging said sleeve and adjustable thereon to position said bearing, and a set screw carried by said ring and extensible through the aperture in said sleeve to engage a shaft, said set screw functioning to draw the ring toward and thereby to clamp the end of the sleeve to the shaft.

2. In a device of the class described, comprising bearing units and a surrounding bearing case in assembly with a shaft sleeve for application to a shaft, the improvement which consists in an unsplit shaft sleeve and bearing positioning and adjusting rings screwed on the ends of said sleeve and having set screws engageable with the shaft, said set screws located and functioning to draw the rings toward and thereby to clamp the ends of the sleeve to the shaft.

3. In a device of the class described, comprising bearing units with grease seals and a surrounding bearing case in assembly with a shaft sleeve for application to a shaft, the improvement which consists in an unsplit shaft sleeve having threaded ends and openings therein located wholly outside of said bearing units and accompanying grease seals, bearing positioning and adjusting rings screwed on said threaded ends of the sleeve, and set screws in said rings protruding through said openings to engage the shaft, said set screws located and functioning so as to draw the rings toward and thereby to clamp the ends of the sleeve to the shaft.

4. In a device of the class described, comprising bearing units and a surrounding bearing case in assembly with a shaft sleeve for application to a shaft, the improvement which consists in a substantially non-contractible shaft sleeve and non-contractible bearing positioning and adjusting rings screwed directly on the ends of said sleeve and having set screws engageable with the shaft for securing the rings, and thereby securing the sleeve, to the shaft.

5. In a device of the class described, comprising bearing units and a surrounding bearing case in assembly with a shaft sleeve for application to a shaft, the improvement which consists in an unsplit shaft sleeve having threaded ends and openings therein, non-contractible rings screwed on said threaded ends and cooperating with the bearing units for positioning and adjusting purposes, and set screws in said rings protruding through said openings to engage the shaft for securing the rings, and thereby securing the sleeve, to the shaft.

In testimony whereof, I have signed my name to this specification.

ARTHUR P. STRONG.